United States Patent [19]
Crawford

[11] Patent Number: 5,228,414
[45] Date of Patent: Jul. 20, 1993

[54] VALVELESS TWO-STROKE-CYCLE OSCILLATING ENGINE

[75] Inventor: Jimmye Crawford, Yakima, Wash.

[73] Assignee: Robert D. Hall, Yakima, Wash.; a part interest

[21] Appl. No.: 943,443

[22] Filed: Sep. 10, 1992

[51] Int. Cl.$^5$ .................................................. F02B 53/00
[52] U.S. Cl. ................................. 123/18 R; 123/18 A
[58] Field of Search ........................... 123/18 R, 18 A

[56] References Cited

U.S. PATENT DOCUMENTS

| | | | |
|---|---|---|---|
| 1,010,583 | 12/1911 | Carmichael et al. | |
| 1,490,820 | 4/1924 | Gross | |
| 3,315,648 | 4/1967 | Del Castillo | 123/18 R |
| 3,318,294 | 5/1967 | Harris | 123/61 |
| 3,338,137 | 8/1967 | James | 91/223 |
| 3,388,693 | 6/1968 | James | 123/18 R |
| 3,408,991 | 11/1968 | Davis | 123/18 R |
| 3,910,238 | 10/1975 | James | 123/18 R |
| 3,945,348 | 3/1976 | Balve | 123/18 R |
| 4,027,475 | 6/1977 | Folsom | 60/39.61 |
| 4,346,677 | 8/1982 | Nye | 123/54 B |
| 4,599,976 | 7/1986 | Meuret | 123/18 R |
| 4,823,743 | 4/1989 | Ansdale | 123/18 R |
| 4,884,532 | 12/1989 | Tan et al. | 123/18 R |
| 5,074,253 | 12/1991 | Dettwiler | 123/18 A |
| 5,076,220 | 12/1991 | Evans et al. | 123/65 VC |

FOREIGN PATENT DOCUMENTS 2256776 6/1974 Fed. Rep. of Germany .... 123/18 R

Primary Examiner—Willis R. Wolfe
Assistant Examiner—M Macy
Attorney, Agent, or Firm—Stratton Ballew Richardson

[57] ABSTRACT

A two-stroke-cycle engine has a pivoted divider oscillating within a fan-shaped combustion volume. The divider is connected to a connecting rod which is connected to an output crankshaft. Seals are used instead of piston rings. Each of the two radial walls has a spark plug and a fuel injection tube located near the outer end. Each planar parallel side wall has an air inlet port near the inner end. An exhaust port is located in the center of the arcuate wall.

9 Claims, 10 Drawing Sheets

VALVELESS TWO-STROKE-CYCLE OSCILLATING ENGINE

BACKGROUND OF THE INVENTION

1. Field of the Invention

In the field of internal combustion engines, the valveless two-stroke engine is desirable from the standpoint of simplicity and relatively high output per unit of weight. Unfortunately, the performance of the conventional two-stroke-cycle engine suffers from a relatively low volumetric efficiency, caused by the piston uncovering the exhaust port(s) relatively early in the power stroke.

2. Description of the Related Art

U.S. Pat. No. 5,076,220 to Evans et al. discloses a two-stroke-cycle diesel with an offset crankshaft. The engine uses poppet valves in the cylinder head for exhaust.

U.S. Pat. No. 5,074,253 to Dettwiler discloses an oscillating work piston and an oscillating compressor piston. The intake valves are spring-operated. Actually, this is a semi-diesel because it uses a glow plug. The engine has a motion-converting unit.

U.S. Pat. No. 4,884,532 to Tan et al. discloses an oscillating piston two-stroke-cycle engine in which air is admitted at the top and flows to the cylinder through piston grooves. Exhaust ports are located at the end of piston travel. This engine utilizes one connecting rod.

U.S. Pat. No. 4,823,743 to Ansdale discloses a motor-driven compressor using an oscillating vane.

U.S. Pat. No. 4,346,677 to Nye discloses what appears to be a single-acting gasoline engine with an oscillating piston driving a complex set of cranks. It is possible to vary the length of the piston stroke, thereby obtaining a nearly constant compression cycle.

U.S. Pat. No. 4,027,475 to Folsom discloses an engine which may be internal or external combustion, which uses an oscillating rotor, and which uses an energy conversion device to obtain rotary output motion.

U.S. Pat. No. 3,945,348 to Balve discloses a two-vane oscillating engine with a controlled air intake. The location of the intake and exhaust ports is interesting.

U.S. Pat. No. 3,388,693 to James discloses a spark-ignited engine with two power cylinders and one air pump cylinder.

U.S. Pat. No. 3,338,137 to James discloses a spark-ignited engine featuring opposed oscillating pistons. Intake and exhaust ports are in the sides of the combustion chamber.

U.S. Pat. No. 3,318,294 to Harris discloses a spark-ignited two-stroke-cycle engine in which the piston reciprocates. The piston operates an air pressure charger.

U.S. Pat. No. 3,315,648 to Del Castillo discloses an oscillating piston spark-ignited engine, using poppet valves for intake and exhaust. A separate transmission converts oscillating motion into rotary motion.

U.S. Pat. No. 1,490,820 to Gross discloses a four-stroke-cycle spark-ignited engine having two opposed oscillating vanes. The engine uses poppet valves for intake and exhaust.

U.S. Pat. No. 1,010,583 to Carmichael et al. discloses a spark-ignited gasoline engine with two oscillating pistons. There does not appear to be any exhaust means.

SUMMARY OF THE INVENTION

The valveless two-stroke cycle engine of the present invention offers a great improvement in volumetric efficiency. The combustion chamber is fan-shaped, and the moving element is not a piston, but is a pivoted oscillating divider. Each of the end or radial walls of the fan-shaped combustion chamber has a spark plug and a fuel injection tube near the outer end of the radius. The arcuate wall, or top wall, of the combustion chamber has the exhaust port located at the center. Each of the side walls, which are flat and parallel to each other, has an air inlet opening centrally located in the wall.

In the engine as described and illustrated herein, the exhaust port is uncovered before the inlet port during the power stroke. The design and location of the exhaust port, and the design of the oscillating divider is such that the exhaust port is not uncovered until the power stroke of the divider has utilized approximately 74% of the available combustion chamber volume. This represents a high volumetric efficiency for a valveless two-stroke cycle engine, and thus provides a high fuel efficiency. In most such engines, the exhaust port is uncovered when the piston or divider has utilized only about 50% of the combustion chamber volume.

In addition, the engine is designed for a full load speed of approximately 1,300 revolutions per minute. This relatively low speed allows for more thorough scavenging, and for more complete combustion of the fuel. In addition, there is virtually no side load on the divider, thus avoiding cylinder wear.

Combustion occurs on both sides of the divider, thus providing two power strokes per engine revolution. The engine utilizes a conventional connecting rod and crankshaft assembly and, considering that there are two power strokes per revolution of the crankshaft, it can be seen that the engine will always deliver high torque.

The engine is provided with a belt-driven air supply blower, and a gear-driven fuel injection system. This is a dry sump engine, with the lubricating oil pump being driven by a chain-and-sprocket drive.

It is an object of this invention to provide an internal combustion engine having few moving parts, high torque and slow speed, creating less friction and, therefore, more efficiency.

It is a further object of this invention to provide a two-stroke cycle engine having high volumetric efficiency.

It is a further object of this invention to provide a design in which the entire assembly can be stacked against one or more other assemblies, utilizing a common crankshaft, for higher power output.

It is a further object of this invention to provide an internal combustion engine in which the wrist pin goes off center at the beginning of each power stroke, thus providing more continuous torque.

DETAILED DESCRIPTION OF THE INVENTION

Figure 7:
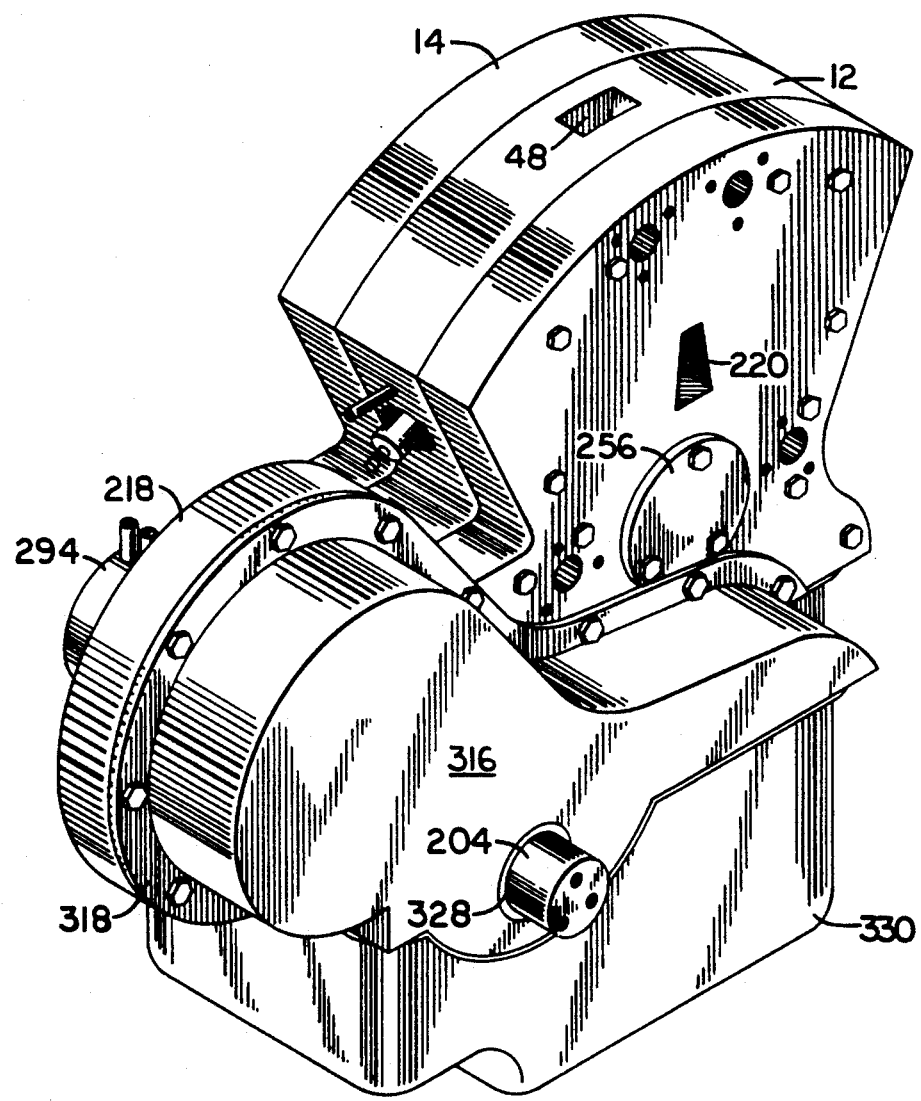
FIG. 7 is a perspective view of the front of the assembled engine.
Figure 8:
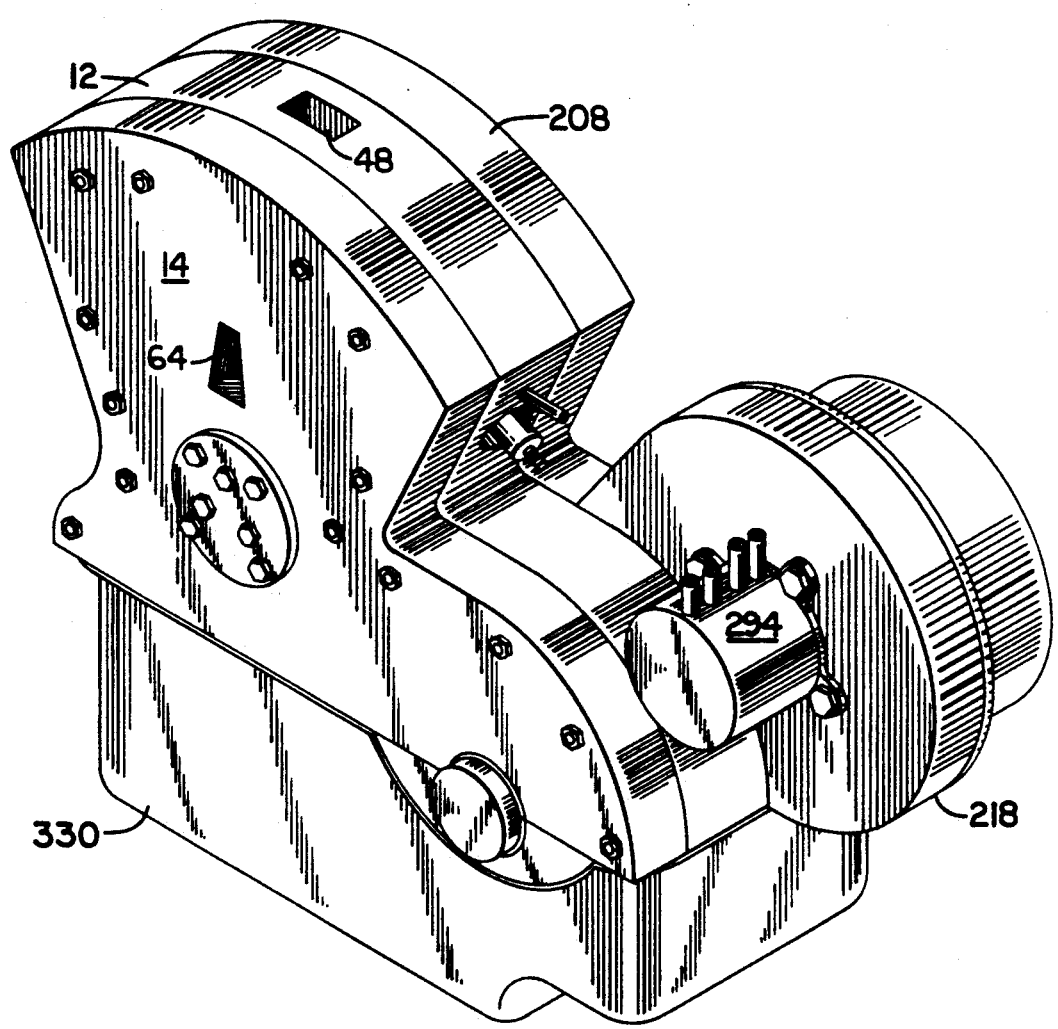
FIG. 8 is a perspective view of the rear of the assembled engine.
Figure 9:
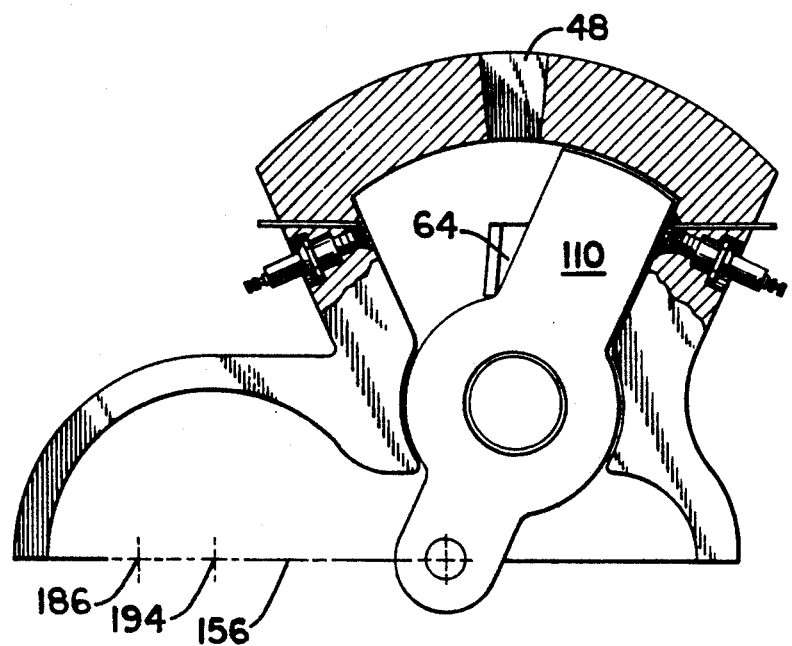
FIG. 9 is a schematic drawing showing the position of the divider at the start of a power stroke.
Figure 10:
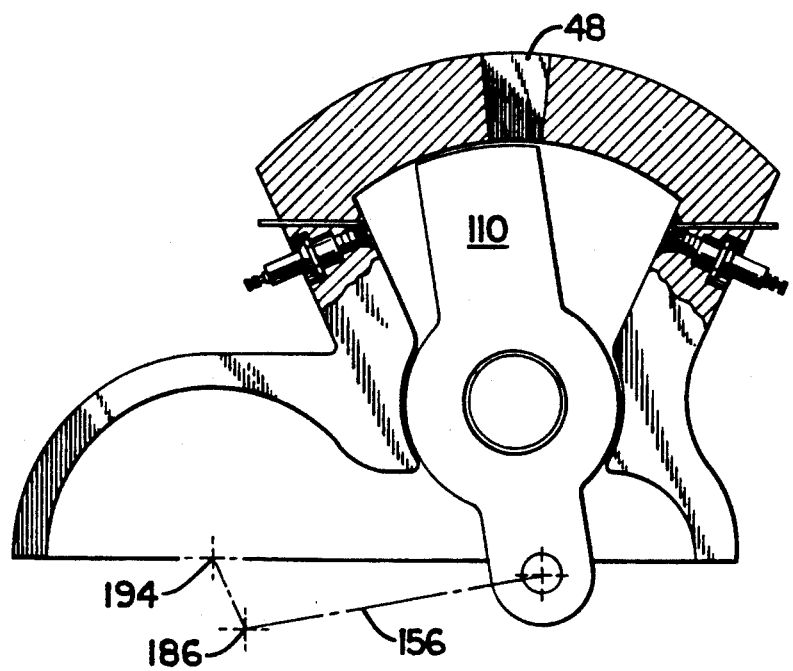
FIG. 10 is a schematic drawing showing the position of the divider at the point of uncovering the exhaust port.
Figure 11:
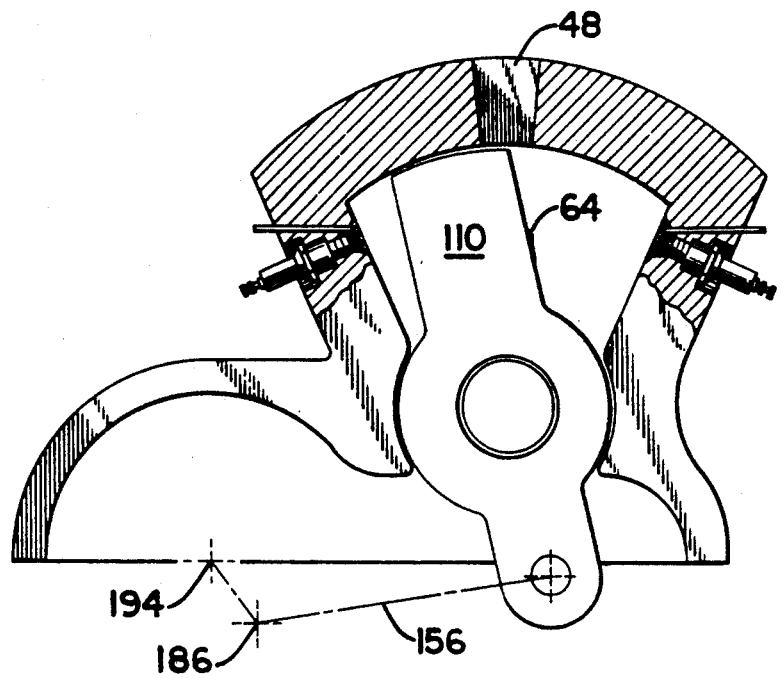
FIG. 11 is a schematic drawing showing the position of the divider at the point of uncovering the inlet ports.
Figure 12:
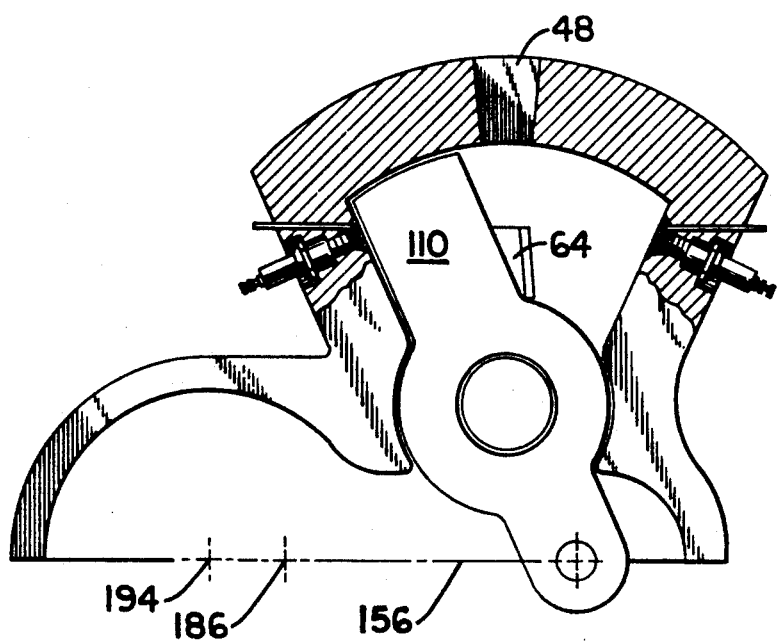
FIG. 12 is a schematic drawing showing the position of the divider at the end of the power stroke.

The engine of this invention is indicated generally as 10, and is illustrated fully assembled in FIGS. 7 and 8.

Figure 1:
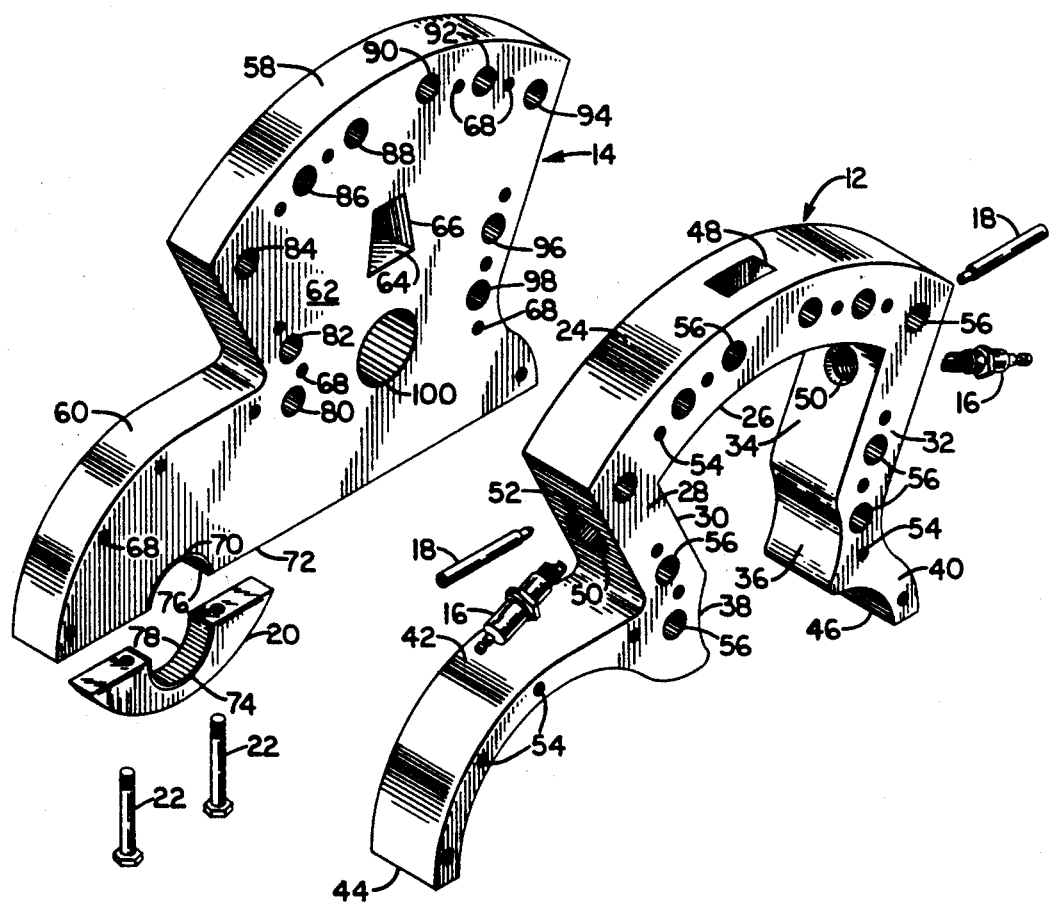
FIG. 1 is a perspective view of the center block and rear block of the engine and some additional parts.

FIG. 1 is an exploded view of the center block 12 and rear block 14, as well as the spark plugs 16, the fuel injection tubes 18, a crankshaft main bearing block 20 and bearing block bolts 22. Center block 12 has arcuate upper section 24 having outer surface 25. The interior surface of arcuate upper section 24 forms the upper wall 26 of the combustion chamber of engine 10. Combustion chamber end section 28 having planar interior surface 30 extends radially downward from one end of arcuate upper section 24. Combustion chamber end section 32 having planar interior surface 34 extends radially downward from the other end of arcuate upper section 24. Arcuate pivot bearing surface 36 is a continuation of planar surface 34. Arcuate pivot bearing surface 38 is a continuation of planar surface 30. Arcuate section 40 extends downward from combustion chamber end section 32 and forms part of the crankcase. Crankcase top 42 extends horizontally and then curves downwardly from the lower end of combustion chamber end section 28. End 44 of crankcase top 42 is at the same level as end 46 of arcuate section 40, and both ends 44 and 46 are co-linear with the centerline of the crankshaft (to be described later).

Exhaust passageway 48, penetrating through the entire thickness of upper arcuate section 24 is located in the center of upper arcuate section 24, and allows gases from the combustion chamber to exit from the engine 10. Threaded passageways 50 are provided in combustion chamber end sections 28 and 32 for insertion of spark plugs 16. Additionally, cylindrical passageways 52 are provided for insertion of fuel injecton tubes 18. Transverse passageways 54 are provided for throughbolts used for assembly of the engine 10. Transverse water cooling passageways 56 penetrate all the way through center block 12.

Rear block 14 has the same outline shape as center block 12, including arcuate element 58 and crankcase extension element 60. A portion of surface 62 forms one side of the combustion chamber. Air inlet passage 64 is trapezoidal in shape and extends through rear block 14. The opening 66 at the inner end of air inlet 64 is larger than the opening on the side of rear block 14 which is not shown in these drawings. Transverse boltholes 68 for assembly throughbolts are provided in rear block 14.

Rear block 14 is provided with cylindrical cutout 70, the centerline of which is co-linear with the bottom edge 72 of rear block 14. Bearing block 20 has a cylindrical cutout 74 of the same size as cutout 70. When bearing block 20 is assembled to rear block 14 by means of bolts 22, cutouts 70 and 74 form a cylindrical passageway. Upper bearing shell 76 is fitted in cutout 70, and lower bearing shell 78 is fitted in cutout 74.

Rear block 14 has water cooling passageways 80, 82, 84, 86, 88, 90, 92, 94, 96 and 98 corresponding in location to cooling water pasages 56 in center block 12. Each pair of cooling water passages, i.e. 80–82, 84–86, 88–90, 92–94, 96–98 is connected togerther with a U-shaped cooling water passage (not shown).

Cylindrical pivot pin passageway 100 is located below the centerline of air inlet 64.

Figure 2:
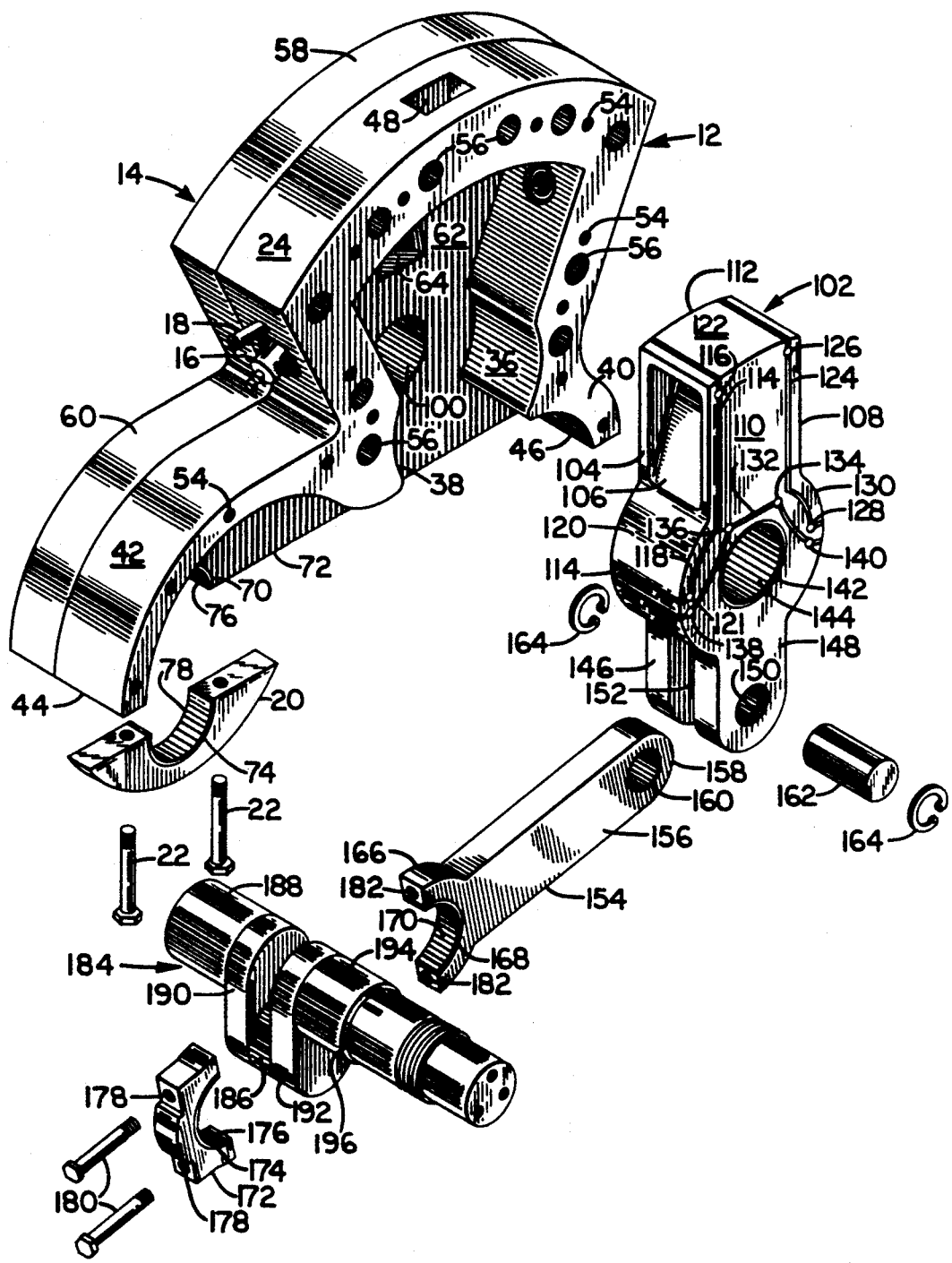
FIG. 2 is a perspective view of the parts of FIG. 1 assembled together, and showing additionally the divider, connecting rod and crankshaft.

Referring now to FIG. 2, center block 12 and rear block 14 are shown in their assembled position. The oscillating divider, indicated generally as 102, has a first combustion face 104. First combustion face 104 has recess 106 which forms part of the combustion volume. Second combustion face 108 (not shown) is identical to first combustion face 104, including a recess forming part of the combustion volume. Divider 102 has a front side 110 and a rear side 112 (not shown). The seals used on the divider are similar to those used in a conventional rotary engine. Each seal is underlaid with a spring resting in the bottom of a groove.

Seal 114, beginning at retainer 116, extends downward parallel to edge 118 of front side 110. Seal 114 then follows the arcuate edge 118 of pivot area 120 to retainer 121. Seal 114 then follows a transverse path across pivot area 120 and follows a similar path (not shown) on rear side 112, finally crossing arcuate top 122 and continuing downweard to retainer 116. Similarly, seal 124 begins at retainer 126, continues downward and then arcuately to retainer 128, then transversely across pivot area 130, and follows a similar pattern on rear side 112, finally crossing arcuate top 122 and continuing downward to retainer 126. Seal 132 extends between retainers 134 and 136, then follows an arcuate path to retainer 138, from which it follows a transverse path acros pivot area 120, parallel to seal 114. Seal 132 then follows a similar path on rear side 112 of divider 102 and pivot area 130 to retainer 140, from which seal 132 follows an arcuate path to retainer 134.

Cylindrical pivot pin passageway 142, lined with bearing 144 extends transversely through divider 102. The lower end of divider 102 is bifurcated into fork 146 and fork 148 which are spaced apart and parallel. Cylindrical passageway 150 is formed in fork 148, and cylindrical passageway 152, of the same diameter and colinear with passageway 150, is formed in fork 146. There is a snap ring groove in passageway 150 near the outer end thereof. A similar groove (not shown) is formed near the outer end of passageway 152.

Connecting rod 154 having a straight rectangular shank 156 terminates at a first end in rounded end 158. Cylindrical passageway 160, having the same diameter as passsageways 150 and 152 is bored transversely through rounded end 158. Wrist pin 162 has a sliding fit within passageways 150, 152 and 160, and is of such a length as to extend between the snap ring grooves. Wrist pin 162 is retained in place by snap rings 164. Second end 166 of connecting rod 154 is semi-cylindrical, and has semi-cylindrical cutout 168, which is lined with bearing 170. Connecting rod bearing cap 172 has semi-cylindrical cutout 174, of the same size as cutout 168, and is lined with bearing 176. Cylindrical passageways 178 are provided for bearing cap bolts 180. Threaded holes 182 are provided in connecting rod 154 for securement of bolts 180.

Crankshaft 184 has crank bearing 186 which has a diameter suitable for rotatable engagement within bearing shells 170 and 176 when connecting rod 154 and bearing cap 172 are assembled. Crankshaft 184 has cylindrical first end 188, the diameter of which is adapted for rotation within crankshaft bearing shells 76 and 78. Crankshaft cheeks 190 and 192 are located on either side of crank bearing 186. Crankshaft main bearing 194 is located adjacent cheek 192.

Figure 3:
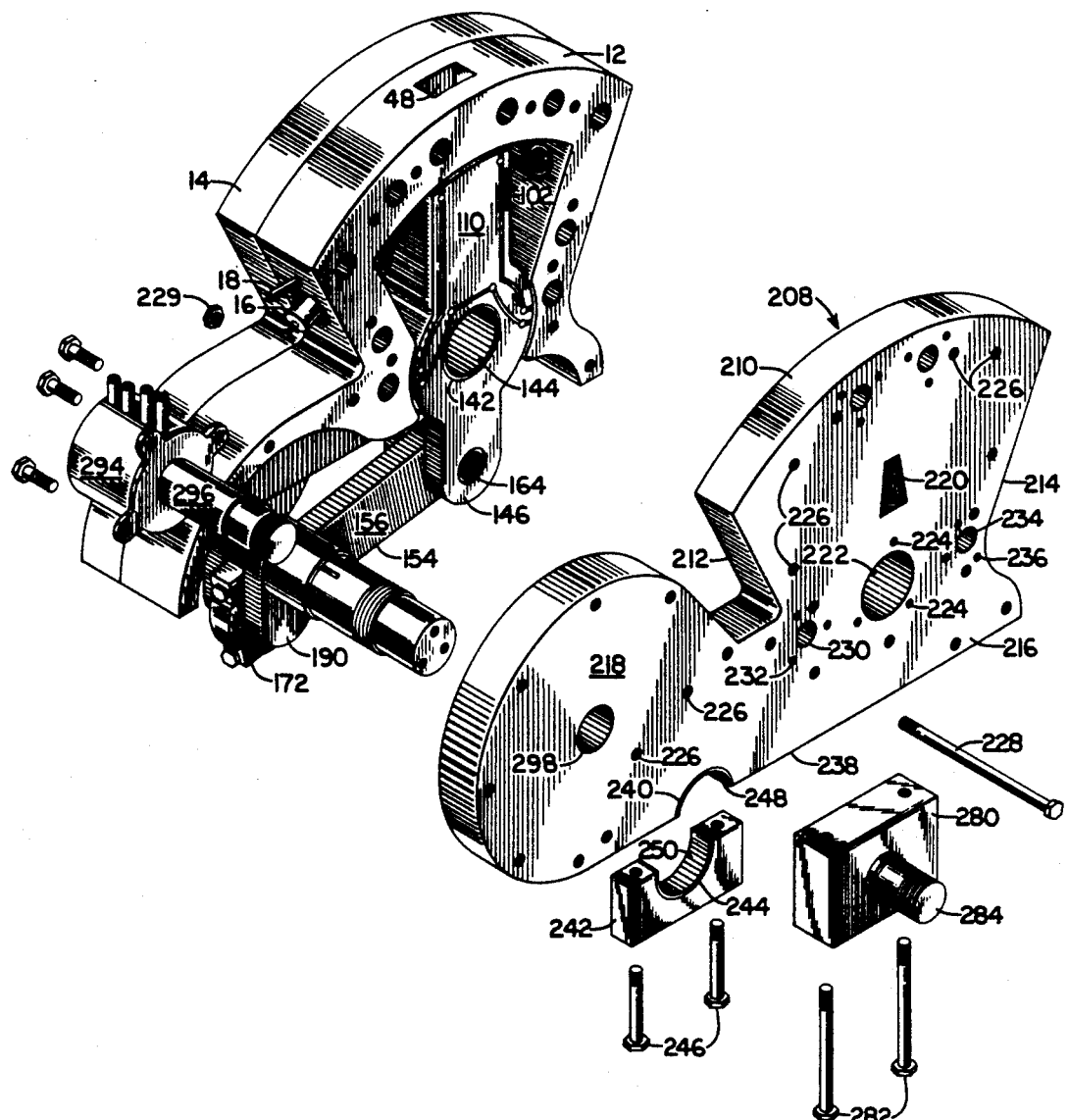
FIG. 3 is a perspective view of the parts of FIG. 2 assembled together and showing additionally the front block.

Referring now to FIG. 3, divider 102, connecting rod 154 and crankshaft 184 are shown in assembled position within center block 12. In the combustion chamber and pivot pin area, front block 208 has the same upper outline as center block 12. Arcuate element 210 matches the shape of arcuate upper section 24 of center block 12. Radial edge 212 extends radially inward from a first end of arcuate element 210, while radial edge 214 extends radially inward from a second end of arcuate element 210. Extension 216 matches pivot bearing section 40 of center block 12 in outline. Lobed extension 218 provides a wall and mounting area for an accessory gear case (to be described later). Air inlet 220 has the same shape as air inlet 64 in rear block 14 and is similarly located. Pivot pin bore 222 is located directly below air inlet 220. Three threaded pivot pin securement holes 224 are located around pivot pin bore 222. Cylindrical passageways 226, alined with passageways 54 in center block 12, are provided for assembly throughbolts 228, which are secured by nuts 229. The interior water cooling passage arrangement (not shown) is identical to that of rear block 14. Water cooling inlet 230 has three threaded holes 232 around it for attachment of a suitable water fitting (not shown). Water cooling inlet 234 likewise has three threaded holes 236 around it for attachment of a suitable water fitting (not shown). Lower edge 238 of front block 208 is colinear with lower edge 72 of rear block 14, but continues to form lobed extension 218. Cutout 240, of the same size and corresponding location as cutout 70 in rear block 14, is provided for the crankshaft main bearing 194. Crankshaft main bearing block 242 has cutout 244 for crankshaft main bearing 194. When crankshaft main bearing block 242 is assembled to lower edge 238 of front block 208, by means of bolts 246, cutouts 240 and 244 form a cylindrical bore. Bearing shells 248 and 250 provide a rotatable fit for crankshaft main bearing 194.

Figure 4:
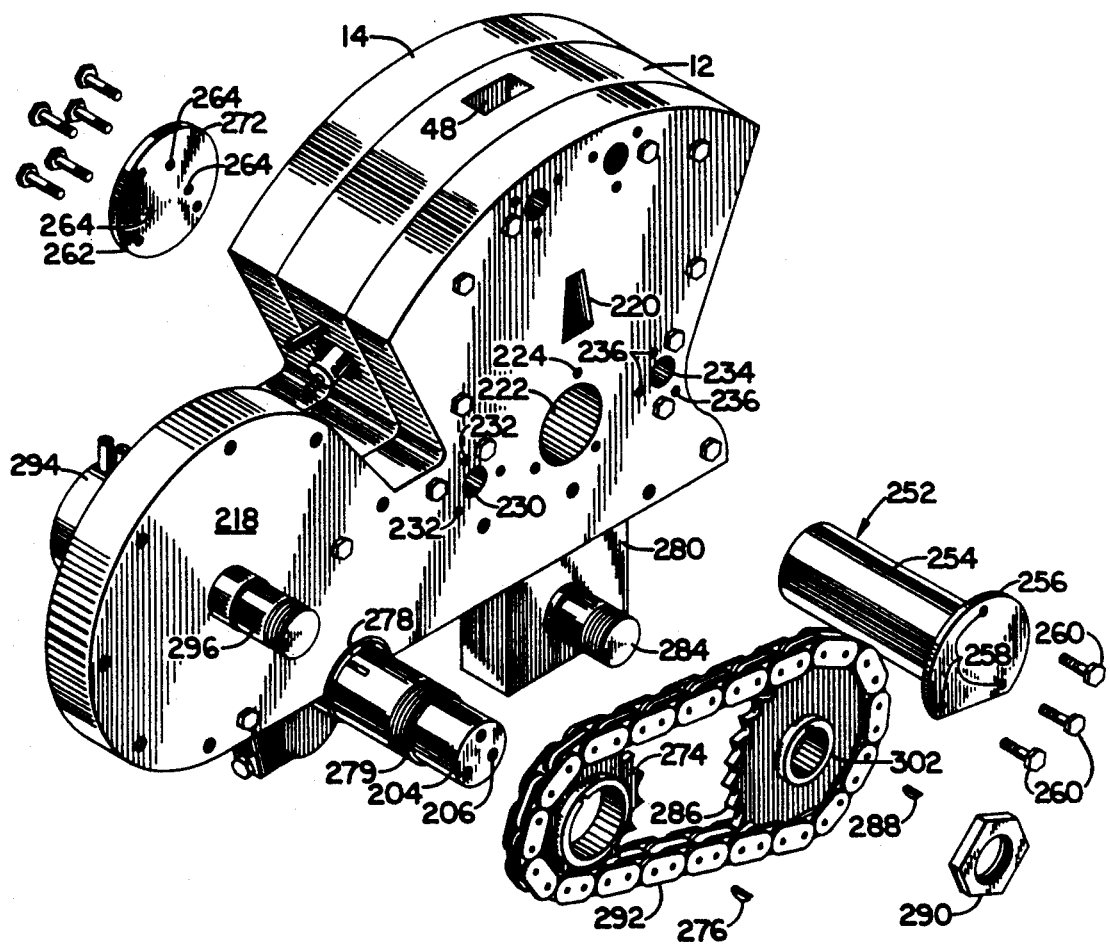
FIG. 4 is a perspective view of the parts of FIG. 3 assembled together and showing additionally the pivot pin, oil pump and oil pump drive means.
Figure 5:
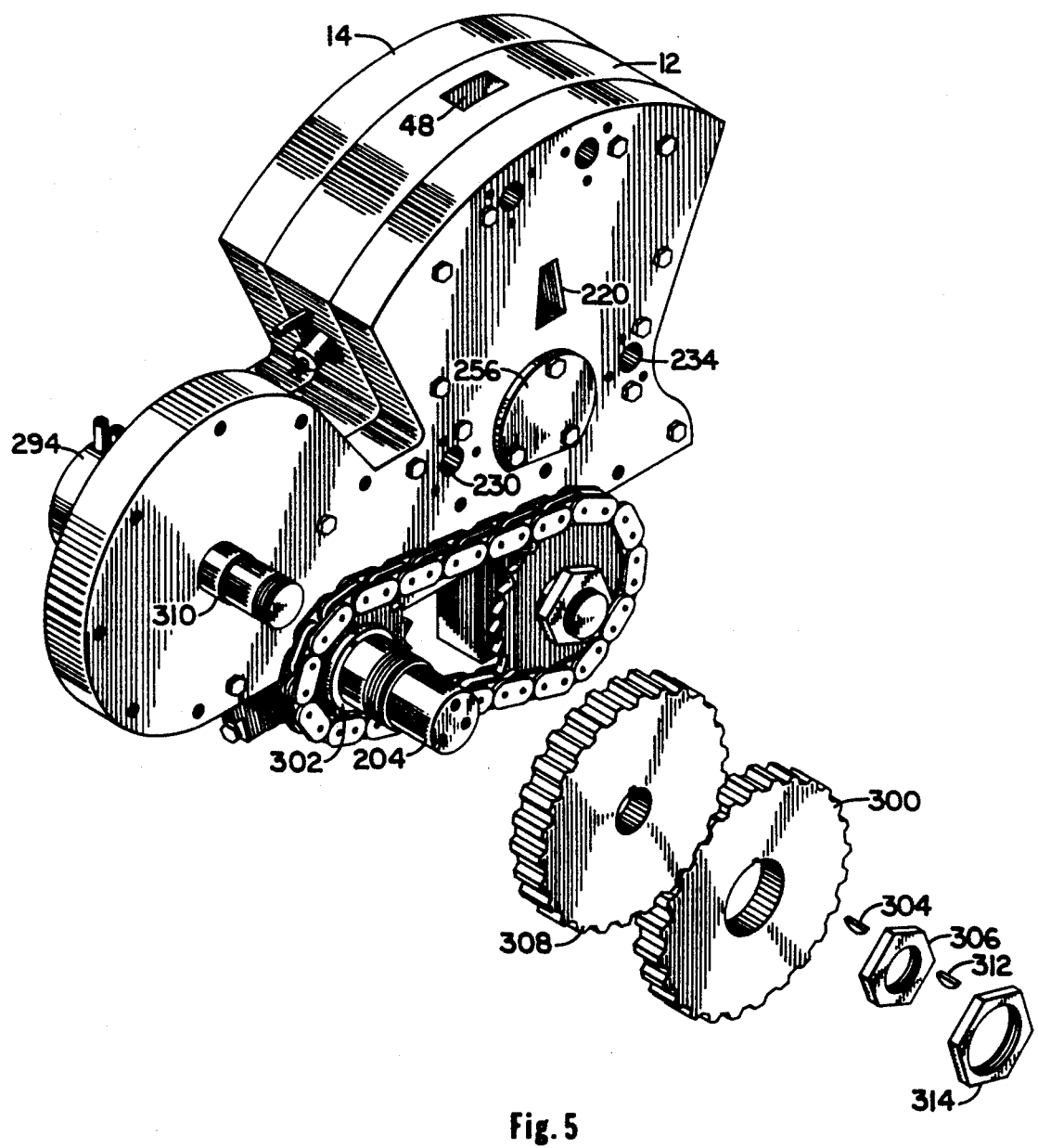
FIG. 5 is a perspective view of the oil pump drive means assembled to the engine, and showing also the accessory drive gears.
Figure 6:
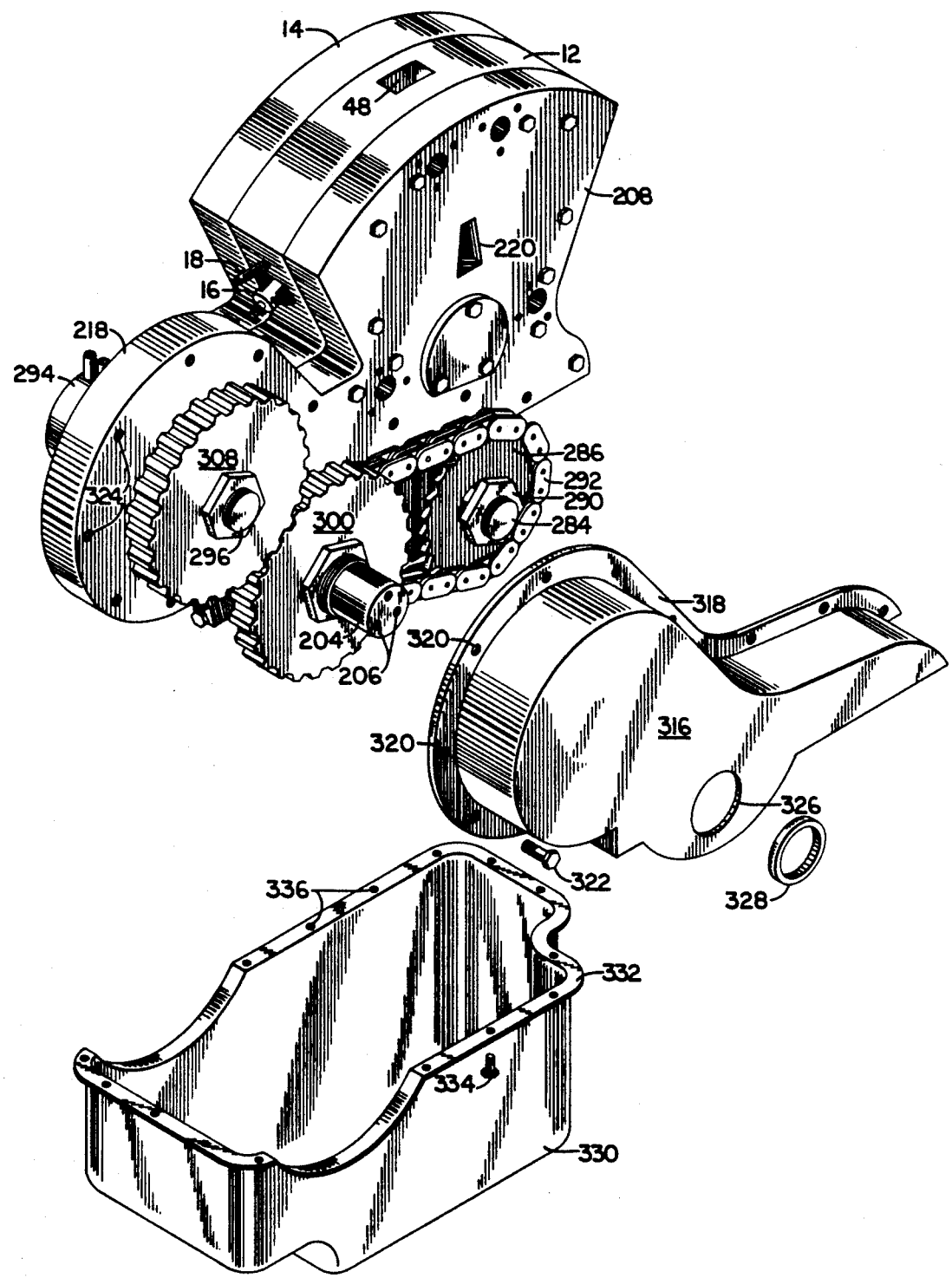
FIG. 6 is a perspective view of the engine with accessory gears assembled thereto, and showing additionally the accessory gear case and oil pan.

Referring now to FIG. 4, rear block 14, center block 12 and front block 208 are shown assembled, and divider 102, connecting rod 154 and crankshaft 184 are assembled within the engine. Pivot pin 252 has cylindrical portion 254 whose diameter is adapted for a sliding rotatable fit within bearing 144 of divider 102. Circular retaining element 256 is located at a first end of pivot pin 252. Retaining element 256 has three holes 258 suitable for insertion of retaining bolts 260 which are screwed into holes 224 in front block 208. Pivot pin retainer plate 262 has three holes 264 for accommodating bolts 266 which are screwed into corresponding holes (not shown) in end 268 of pivot pin 252. Pivot pin 252 is further fixed in position by means of bolts 270 which are placed through holes 272 in retainer plate 262 and screwed into threaded holes (not shown) in rear block 14.

Sprocket 274 is retained on crankshaft 184 by means of key 276 and rests against shoulder 278. Oil pump 280 is attached to lower edge 238 of front block 208 by means of bolts 282. Oil pump drive shaft 284 extends from oil pump 280. Sprocket 286 is fitted to drive shaft 284 by means of key 288, and is retained on drive shaft 284 by means of nut 290. Oil pump drive chain 292 connects sprockets 274 and 286.

Fuel pump 294, having drive shaft 296, is bolted to the engine side of front block 208. Fuel pump drive shaft 296 extends through cylindrical passageway 298 in front block 208.

Accessory drive gear 300 rests against shoulder 302 on sprocket 286 and is retained in place by means of key 304 and nut 306. Accessory drive gear 308, having the same pitch diameter and number of teeth as gear 300, rests against shoulder 310 and is retained in place by means of key 312 and nut 314.

Cylindrical portion 204 of crankshaft 184 extends from threaded portion 279. Threaded holes 206 in the end of cylindrical portion 204 are provided for mounting an accessory drive pulley (not shown) which would be adapted to drive an air intake compressor (not shown).

Accessory gear case 316 is provided with flange 318 having passageways 320 for bolts 322 which are secured into threaded holes 324 in front block 208. There is a circular passageway 326 into which oil seal 328 is inserted to accommodate extension 204 of crankshaft 184.

Oil pan 330 has flange 332 which conforms to the assembled shape of rear block 14, center block 12, front block 208 and accessory gear case 316. Oil pan 330 is secured to the asembled engine 10 by means of bolts 334 placed through holes 336, the bolts engaging threaded holes (not shown) in the bottom edge of assembled engine 10. A gasket (not shown) would be provided.

Water outlets 338 and 340 are provided near the top of front block 208.

As viewed in FIGS. 1–12 the engine 10 is designed so that the crankshaft 184 will turn counter-clockwise. Referring to FIGS. 9-12 it can be seen that, during a power stroke, exhaust port 48 will be not be uncovered until divider 102 has completed most of the power stroke. Intake ports 64 and 220 will not be uncovered until after the beginning of uncovering of exhaust port 48. This arrangement of exhaust and intake ports insures that a high volumetric efficiency will be obtained, as compared to a conventional two-stroke-cycle engine in which exhaust begins about halfway through the power stroke.

In the described embodiment, there are two fuel injectors, with one extending through each radial wall of the fan-shaped combustion chamber. The injectors are supplied with fuel by a fuel injection pump which is timed and powered by an accessory drive gear. In this injection mode, timing of the engine is spark controlled.

Because this is a direct injection system, fuel from the injectors controls engine speed from idle to maximum revolutions per minute.

The engine is provided with intake air by an externally driven blower which provides air at a pressure higher than atmospheric pressure. There is no throttle plate, and therefore there is no engine pumping loss.

By the nature of the engine design, the wrist pin travels in an arc. The only time the center line of the crankshaft, the connecting rod journal and the wrist pin are in a straight line is when the divider is at the extreme right or extreme left of its travel. At the moment the power stroke begins, as the crankshaft rotates over center, the wrist pin goes off center, thus generating torque the moment the power stroke begins.

The location of the intake ports near the bottom of the combustion chamber, and the location of the exhaust port at the top of the combustion chamber, enhances superior blowdown and recharging of air into the combustion chamber. The walls of the intake ports can be angled to enhance blowdown and to enhance recharging of the combustion chamber with intake air.

The distance from the center of the pivot shaft to the top of the divider is greater than the distance from the center of the pivot shaft to the center of the wrist pin. This gives a built-in leverage advantage, increasing engine torque.

The oil level in the oil pan is below all moving parts, so that this engine would be considered a dry sump engine, adding to the engine efficiency.

This engine is a module; that is, it can be stacked, using an additional center block and rear block, divider and connecting rod, and an additional connecting rod journal to the crankshaft, as well as lengthening the pivot shaft. In an engine having two or more modules, the block separating combustion volumes would have a side air entrance connecting with air inlet passages that extend through the separating block. With one module added, the engine would fire four times per revolution. Of course, more than one module may be added.

The compression rings are lubricated by injecting oil from the oil pan into the combustion chamber through the air intake just before the air intake is closed by the divider. In that way, oil would not escape out the exhaust port. Other possible methods for lubricating the compression rings would be to add oil to the fuel injector, or to provide a separate pump and injector for spraying a small amount of oil into the combustion chamber just at the time the exhaust port is covered by the divider. Additional oil cooling can be provided by making the divider hollow and supplying oil to the inside of the divider through the pivot shaft.

This engine has less friction loss than a conventional engine because there are fewer moving parts. In addition, the divider would have no measurable amount of side load friction loss. In a conventional engine, the cylinder bore eventually becomes somewhat egg-shaped because of the side loading on the pistons.

Because of the relatively low speed of this embodiment, providing for a longer combustion time and thus more complete combustion, a catalytic converter used on this engine would have a longer effective life.

While this invention is susceptible of embodiment in different forms, the drawings and the specification illustrate the preferred embodiment of the invention, with the understanding that the present disclosure is to be considered an exemplification of the principles of the invention, and the disclosure is not intended to limit the invention to the particular embodiment described.

I claim:

1. A two-stroke cycle internal combustion engine comprising:

a fan-shaped combustion volume having two flat radial end walls, an arcuate top wall and two flat parallel fan-shaped side walls;

a single pivoted divider oscillating on a fixed pivot pin, said divider having a first end and a second end, with the first end of said divider oscillating within the combustion volume thereby dividing the combustion volume into two combustion chambers;

the second end of said pivoted divider being bifurcated;

a connecting rod having a first end and a second end, with the first end being rotatable on a wrist pin located within the bifurcated end of the pivoted divider;

a power output crankshaft, to the crank of which the second end of the connecting rod is rotatably attached;

two spark plugs, with one extending through each radial wall of the fan-shaped combustion chamber;

two fuel injection tubes, with one extending through each radial wall of the fan-shaped combustion chamber;

an exhaust port extending through the center of the arcuate top wall of the combustion chamber; and two air intake ports, with one extending through the center of each of the flat parallel fan-shaped side walls.

2. The engine of claim 1 wherein the divider is fitted with a seal to confine the combustion gases within the combustion chamber, and a seal to control the distribution of lubricating oil on interior surfaces of the engine.

3. The engine of claim 1 wherein the size and location of the exhaust port is such that the beginning of exhaust port opening occurs after the divider has moved through approximately 73 percent of the combustion chamber from the beginning of a power stroke.

4. The engine of claim 1 wherein one complete cycle of the divider from a given radial end wall to the opposite radial end wall, and return, will move the crankshaft one full revolution.

5. The engine of claim 4 wherein there are two power strokes per crankshaft revolution.

6. The engine of claim 1 wherein the flat radial end walls and the arcuate top wall are contained within a center block, one of the flat parallel fan-shaped side walls is provided by a rear block assembled to a first side of the center block, and the other flat parallel fan-shaped side walls is provided by a front block assembled to a second side of the center block.

7. The engine of claim 6 wherein the rear block, center block and front block are provided with cooperating cooling water passages.

8. The engine of claim 1 wherein the distance between the center of the pivot pin and the first end of the divider is greater than the distance between the center of the pivot pin and the center of the connecting rod wrist pin.

9. The engine of claim 1 wherein both the wrist pin and the crankpin move off dead center at the moment of initiation of a power stroke.

* * * * *